United States Patent [19]

Fillion

[11] 4,411,348

[45] Oct. 25, 1983

[54] CONTROL DEVICE FOR ELECTRIC MOTOR-REDUCING UNIT

[75] Inventor: Pierre Fillion, Ville la Grand, France

[73] Assignee: Somfy, Cluses, France

[21] Appl. No.: 145,326

[22] Filed: Apr. 30, 1980

[30] Foreign Application Priority Data

May 2, 1979 [FR] France ................................ 79 11801

[51] Int. Cl.[3] ............................................ F16D 71/00

[52] U.S. Cl. ...................................... 192/139; 74/435; 160/310; 200/38 R; 200/47; 318/470

[58] Field of Search ................ 192/139, 138; 160/310, 160/311; 318/470, 128; 200/47, 38 R, 38 F; 74/435, 820

[56] References Cited

U.S. PATENT DOCUMENTS

| | | | |
|---|---|---|---|
| 1,386,894 | 8/1921 | Rockwell et al. | 192/139 |
| 2,937,732 | 5/1960 | Brady | 192/139 |
| 3,213,715 | 10/1965 | Arenson | 318/470 X |
| 3,814,309 | 6/1974 | Ramstetter | 200/38 R X |
| 3,862,385 | 1/1975 | Johnson | 200/38 R |
| 3,884,088 | 5/1975 | Bertozzi et al. | 74/435 X |

*Primary Examiner*—Rodney H. Bonck
*Attorney, Agent, or Firm*—Robert E. Burns; Emmanuel J. Lobato; Bruce L. Adams

[57] ABSTRACT

This control device for an electric motor-reduction unit is designed to permit the accurate adjustment of the point at which it is desired to stop the rotation of the unit. For this purpose, it comprises a slide controlling during its movement in one direction and during a first time period the movement of beaks of a rocker in a direction in order to open the motor control switch when said beaks are engaged in notches of cam means. In a second time period, the slide causes a two-armed sliding lever supporting the notched-cam shaft to pivot in a direction, each notched cam being rigidly associated with a heart-shaped cam and with a toothed wheel adapted, when inoperative, to mesh with toothed drive pinions. In a third time period, the slide causes the beaks of the aligning lever to bear against the heart-shaped cams in order to align the notches with the beaks. The pinions remain radially fixed. This device is particularly suited for controlling electric motor-reduction units for driving rolling shutters, roller-blinds and the like.

10 Claims, 6 Drawing Figures

CONTROL DEVICE FOR ELECTRIC MOTOR-REDUCING UNIT

BACKGROUND OF THE INVENTION

The present invention relates to device for controlling electric motor-reduction units of the type intended for driving the winding rod, drum or tubular core of a rolling shutter, roller-blind or the like, which comprises a plurality of cams disposed side by side on a common shaft about which they can pivot freely, the outer operative contour of each cam comprising only a single notch. All the cam notches are adapted to be engaged simultaneously by a member controlling a motor control switch, this control member being constantly urged by at least one suitable resilient means against the outer contours of said notched cams, said cams being rigidly coupled with toothed wheels disposed laterally and coaxially in relation thereto and in constant meshing engagement with toothed driving pinions disposed on a shaft parallel to the cam shaft, so as to drive said cams at rotational speeds differing from one cam to another.

A device is provided for aligning at will the cam notches with the switch control member. This device comprises heart-shaped cams each rigid with one of the side faces of a notched cam, and said heart-shaped cams being adapted to cooperate with an aligning member. A control member movable across the cam axis is adapted in a first time period to cooperate with one portion of the switch control member in order to move said switch control member away from the notched cam contours, against the force of the resilient means of said member; in a second time period, said control member is adapted to move the shaft of the toothed drive pinions away from the cam shaft while a resilient means positions and aligns the toothed pinion teeth with respect to the teeth of the matching toothed wheels registering therewith, and in a third time period the same control member is adapted to cause the set of heart-shaped cams to cooperate with the aligning means.

In known devices of this character, such as the one shown diagrammatically in FIG. 1 of the attached drawing, the shaft 1 of the toothed drive pinions 2 is supported by a slide 3 movable in the direction of the arrow 4 against the force of a spring 5 which on the other hand and simultaneously urges the operative beaks 8 of the pivoted lever 6 controlling the motor switch 7 against the outer periphery of notched cams 9. However, this device is attended by various inconveniences; in fact, since the toothed drive pinions are radially movable, the kinematic linkage between the motor-reduction unit and these drive pinions is relatively complicated, inasmuch when this motor-reduction unit has to be coupled in certain cases to two such control devices for stopping the rolling shutter, roller blind or the like in its closed (wound-up) or open (unrolled) positions, respectively. Moreover, the spring 5 must be relatively strong, otherwise the effort exerted by the toothed pinions 2 for rotatably driving the cams 9 might eventually move the toothed pinions 2 in direction 4 and thus disengage them from their meshing engagement with toothed wheels 9, thus discontinuing the drive of these toothed wheels 9. This driving effort is particularly high when the cams 9 must expel from their notches 8 the beaks of member 6 controlling switch 7, against the force of spring 5. Moreover, due to this substantial stressing of spring 5, a considerable effort must be exerted in the direction 4 when it is desired to actuate the device voluntarily for aligning the notches 8 with respect to the beaks of the switch control member 6.

SUMMARY OF THE INVENTION

With the control device for electric motor-reduction units according to this invention the above-mentioned inconveniences of prior art devices of this type are safely avoided. In fact, in the device of this invention the kinematic linkage between the motor-reduction unit and the toothed drive pinion or pinions is simplified because these toothed pinions are not required to move radially when the device is actuated voluntarily for bringing the cam notches into proper alignment with the switch control member, whereby the motor-reduction unit can be connected more easily to a pair of similar control devices for stopping the motor in the rolled-up position or in a unrolled position, respectively, of the rolling shutter, roller-blind or the like. With the arrangement it is also possible, as in the case of the control device of the present invention, to drive at least one of the toothed pinions by means of an internally toothed annulus disposed concentrically within the tubular casing of a so-called "tubular" motor-reduction unit. In fact, in this case a toothed drive pinion is in constant meshing engagement with the internally toothed annulus and a second pinion on the same shaft is in meshing engagement with the toothed wheel rigid with the first cam. Therefore, with this arrangement it is not possible to move said toothed pinion in an outward radial direction for disengaging same from the toothed annulus.

Certain forms of embodiment of the present invention are attended by an additional advantageous feature in that the risk of producing an untimely disengagement of the toothed pinions from the corresponding toothed wheel is considerably reduced in comparison with the prior art, during the normal operation of the roller-blind, rolling shutter or the like. Moreover, the putting of the cam notches into proper alignment in relation to the switch control member can take place much more easily and rapidly, and requires a substantially reduced effort on the control member, so that this reduced effort can be exerted manually or through a remote-control device, such as an electromagnet control device, for aligning the notches as required.

The control device according to the present invention is characterized in that the shaft of the toothed drive pinions is held against radial movement, a movable support member being provided and having at least one portion movable along a path transverse to the pinion axis for supporting the cam shaft. One portion of the control member is adapted to cooperate with the movable cam support member in order to move the cam shaft away from the drive pinion shaft during the aforesaid second operating time period.

In a typical form of embodiment of this invention, the heart-shaped cams are adapted, during the third operative time period, when the cam shaft eventually moves away from the toothed pinions, to cooperate with an aligning member consisting of a fixed stop member suitably shaped for this purpose.

According to another form of embodiment of the invention, in which the aligning member consists of a lever fulcrumed to a pivot pin parallel to the cam axis and adapted to be moved by said control member towards the heart-shaped cams, the movable cam support advantageously but not compulsorily supports the pivot pin of said aligning lever. According to a modified version of this specific form of embodiment, the movable cam support cooperates with the control member not directly but through the medium of said aligning member fulcrumed thereto.

DESCRIPTION OF THE PREFERRED EMBODIMENTS

Figure 2:
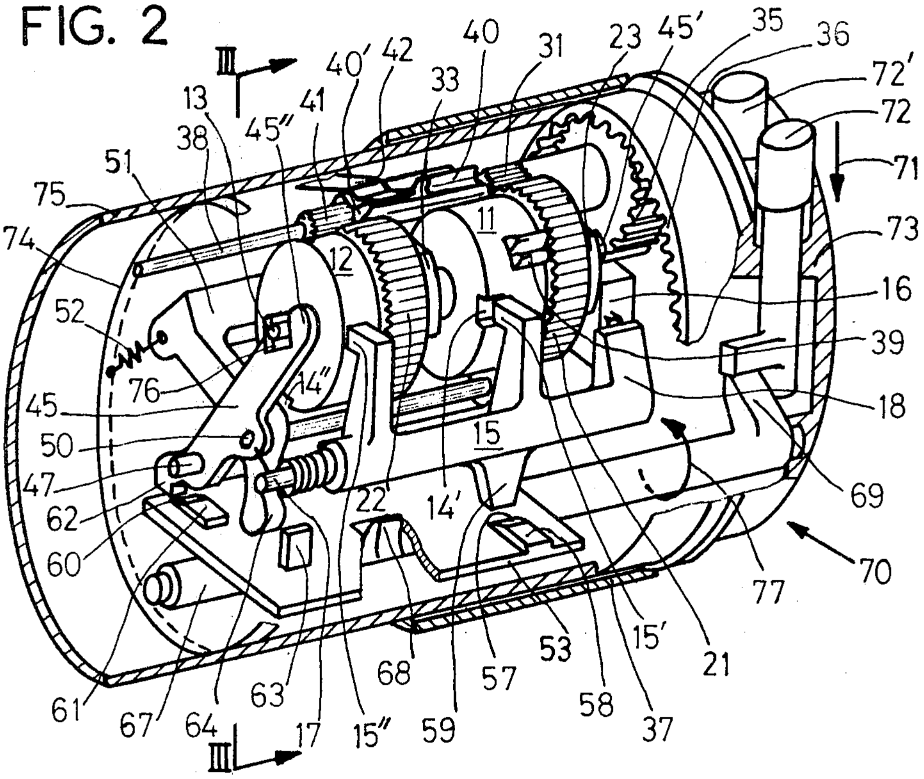
FIG. 2 is a perspective view with parts broken away showing a first form of embodiment of the invention.
Figure 3:
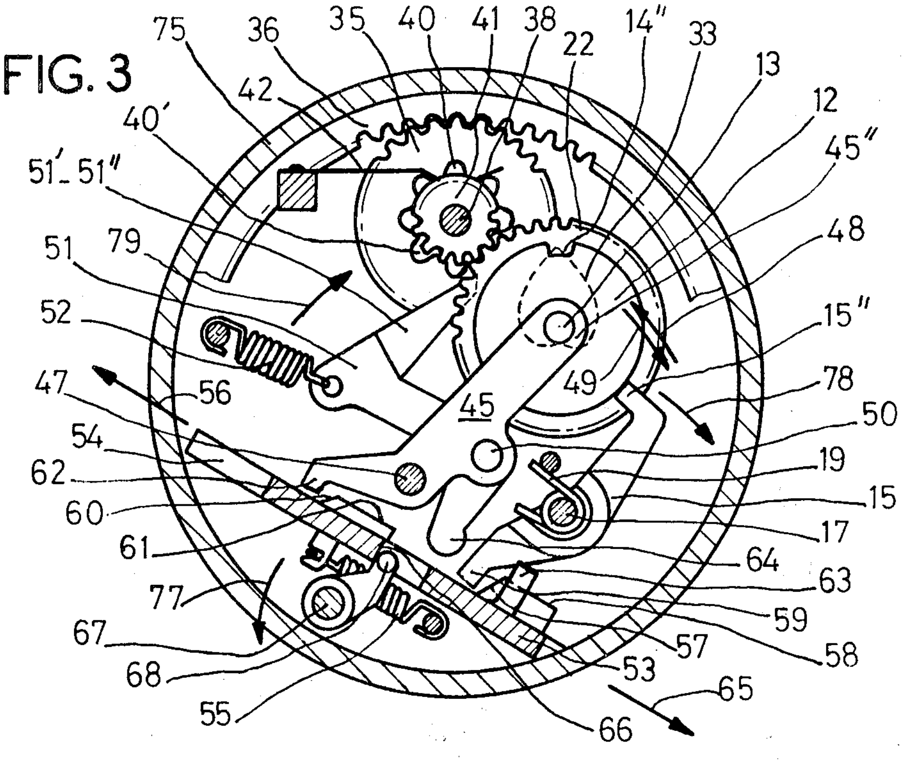
FIG. 3 is a section taken along the line III—III of FIG. 2, showing the same form of embodiment of the invention, in its normal operating condition.
Figure 4:
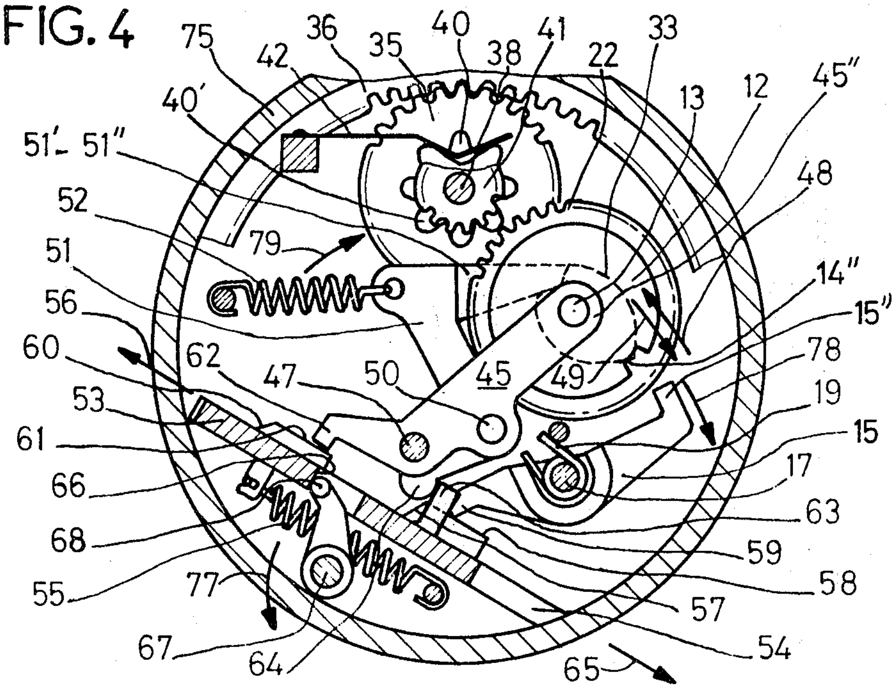
FIG. 4 is another section taken along the line III—III of FIG. 2 but showing the same form of embodiment, at the end of the operation consisting in aligning the notched cams.

Referring first to FIGS. 2 to 4 of the drawings, the control mechanism for a rolling shutter, roller-blind or like device is incorporated in a so-called tubular motor-reduction unit and comprises essentially a pair of cams 11 and 12 disposed side by side on a common shaft 13 on which the cams are adapted to pivot freely. The outer or peripheral contour of each cam 11,12 comprises a single notch 14′, 14″ respectively adapted to cooperate with beaks 15′, 15″ respectively of a member controlling the motor-reduction unit switch 16. More particularly, this control member is comprised of a rocker 15 pivotally mounted on a shaft 17 parallel to the cam shaft 13. This rocker 15, in addition to the pair of arms provided with the aforesaid notch-engaging beaks 15′, 15″, comprises a third arm 18 so disposed as to keep the contacts of switch 16 in their open-circuit position when both beaks 15′, 15″ engage simultaneously the relevant notches 14′, 14″, respectively. This switch 16 is of the back-contact type since its contacts are normally closed, when the switch is inoperative or released. A spring 19, for example a torsion spring (FIGS. 3 and 4) constantly urges the beaks 15′, 15″ towards the cam contours 11,12.

Rigidly coupled to, and coaxial with, the first notched cam 11 is a first toothed wheel 21 in meshing engagement with a toothed drive pinion 31 axially rigidly coupled with a power pinion 35 meshing in turn with an internally-toothed annulus 36 disposed concentrically to the inner tubular casing 75 of the motor-reduction unit. The toothed pinions 31 and 35 are rotatably mounted on a shaft 38 parallel to shafts 13 and 17. In this specific form of embodiment the three shafts 13,17 and 38 are parallel to the axis of the inner tubular casing 75 of the motor-reduction unit. Also in this example the cam 11 has formed in its peripheral contour a pair of teeth 39 adapted, during each revolution of cam 11, to mesh with a toothed counter pinion 40 rotating about shaft 38 and comprising for example eight teeth. A toothed pinion 41 laterally coupled to pinion 40 is in meshing engagement with a second toothed wheel 22 rigid with the second cam 12 and disposed laterally and coaxially in relation to this cam 12.

A resilient device is provided for holding the toothed pinion 40 and consequently the toothed pinion 41, toothed wheel 22 and cam 12 against rotation when the two driving teeth 39 are not in meshing engagement with toothed pinion 40. This resilient device comprises essentially a spring blade 42 constantly bearing resiliently against a portion 40′ of toothed pinion 40, which has only four teeth, every other tooth being removed therefrom.

Each notched cam 11,12 has a heart-shaped cam 23,33, respectively, rigidly connected to one of its lateral faces. The shaft 13 of cams 11,12 and 23,33 is movable in a radial direction and is supported by the first end portions 45′, 45″ of a movable support consisting of a two-armed axially slidable lever 45 of which the other end portions opposite the first ones are pivoted to a shaft 47. This two-armed sliding lever 45, together with the cams and toothed wheels supported thereby, are thus displaceable along a path 48,49 across the shaft 38 supporting the toothed pinions. The beaks 15′,15″ of rocker 15 are constantly urged in the direction of the arrow 48 towards the outer contours of notched cams 11,12 at a point which, in this example, is advantageously opposed to the point of meshing engagement between the toothed wheels 21,22 and the matching toothed pinions 31,41. These beaks 15′,15″ will thus constantly maintain the meshing engagement between the toothed wheels and the relevant pinions.

The two-armed sliding lever 45 supports the two ends of a shaft 50 on which an aligning member is pivoted. This member consists of another two-armed lever 51 having its two beaks 51′, 51″ adapted to act as followers with respect to the aforesaid two heart-shaped cams 23 and 33, respectively, and are constantly urged away from these cams 23,33 for example by a tension spring 52.

In this example, a control member capable of actuating the rocker 15, the two-armed sliding lever 45 and the aligning lever 51 consists of a slide 53 adapted to be guided by suitable means 54. A spring 55 constantly urges this slide 53 to its inoperative position by causing same to recede as shown by the arrow 65 in FIG. 3. Furthermore, this slide 53 has a first cam face 57 formed thereon, which comprises a first extension in the form of a bearing face 58, these two faces 57, 58 being adapted to be engaged by an extension 59 of the rocker 15; a second cam face 60 also formed on slide 53 comprises a second bearing face extension 61, both adapted to cooperate with an extension 62 of the two-armed sliding lever 45. Finally, this slide 53 incorporates a stop lug 63 adapted to engage an extension 64 of aligning lever 51.

Figure 1:
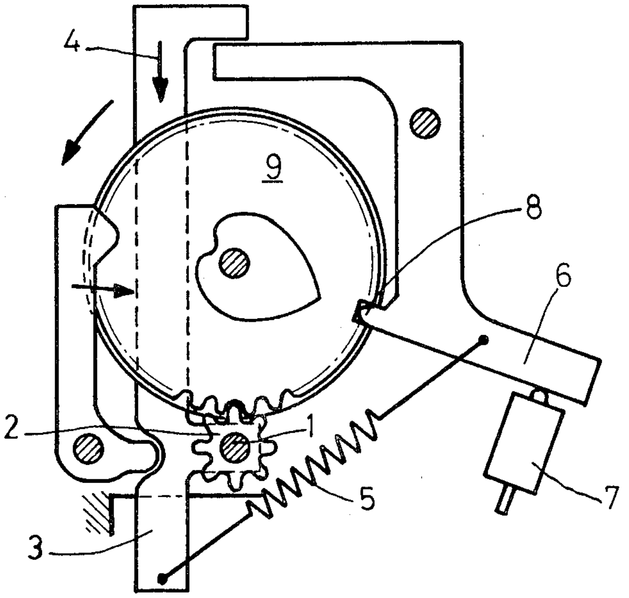
FIG. 1 PRIOR ART
FIG. 1 is a schematic view of prior art device.

A return mechanism is provided for actuating the control device from one end of the tubular motor-reduction unit body. It comprises a rotatably mounted rod 67 parallel to shafts 17 and 47, which carries a first arm 68 adapted to engage with its outer end a bearing face 66 formed in slide 53, and another arm 69 located in close vicinity of the end 70 of the motor-reduction unit (FIG. 1). This second arm 69 is actuatable by means of a suitable control member, for example a sliding push member 72 adapted to be depressed in the direction of the arrow 71 (FIG. 1).

Shafts 38,47 and 17, and rod 67 have one end journaled in the end flange 73 of the motor-reduction unit casing held against rotation and supporting the aforesaid push member 72, and their opposite ends journaled in an end plate 74 supported by the inner tubular member 75 of the motor-reduction unit, which is also held against rotation. The edge of a notch 76 formed in this end plate 74 acts as an axial stop or abutment member to the corresponding end of shaft 13 in order to limit the angular movement, in the direction of the arrow 49 (FIGS. 3 and 4), of the two armed sliding lever 45.

From the above-description it will be readily understood by those conversant with the art that the rotation of toothed pinions 35 and 31 and consequently the rotation at a constant and relatively high speed of notched cam 11 are obtained when the drive or power shaft (not shown) drives the winding tubular member 37 rigid with the internally toothed annulus 36. Thus, during each revolution of cam 11, the pair of driving teeth 39 produce a step by step rotation of notched cam 12, therefore at a lower speed than cam 11. Therefore, for instance, cam 12 can accomplish at the most a complete revolution while cam 11 makes fifteen revolutions corresponding each to about one revolution of the winding tubular member 37. When notches 14' and 14" of cams 11 and 12 respectively are aligned with the corresponding beaks 15' and 15" of rocker 15, these beaks drop into the registering notches 14', 14" and the extension 18 of rocker 15 opens the back contacts of switch 16. Thus, the electric motor (not shown) of the motor-reduction unit is deenergized and the rotation of winding tubular member 37 is discontinued.

It is particularly easy to adjust the stop position of winding tubular member 37 in which the notches 14' and 14" must be aligned with each other. In the inoperative condition and before the adjustment, the various component elements are in the position shown in FIG. 3.

When the rolling shutter, roller-blind or the like is fully wound, for example, on its tubular member 37, it is only necessary to depress the push member 72 in the direction of the arrow 71, thus causing the rotation of rod 67 in the direction of the arrow 77 and the translation of slide 53 in the direction of the arrow 56. This last movement takes place in three time periods or steps. During a first time period, the cam face 57 moes the extension 59 in the direction 56 against the resilient force of spring 19, thus moving the beaks 15' and 15" in the direction 78 away from the relevant contours of cams 11 and 12, the extension 18 keeping the switch 16 in its release or closed-contact position. The bearing face 58 then holds the extension in its lifted position to keep the beaks 15', 15" in their position clear of the cam contours. In a second time period, cam face 60 moves the extension 62 in the direction 56, thus causing the pivotal movement of the two-armed sliding lever 45 and the pivotal movement of shaft 13 in the direction 49 together with the cams and toothed wheels carried by this shaft. The wheels 21, 22 are thus disengaged from the corresponding toothed pinions 31 and 41, and the bearing face 61 is pressed against the extension 62 to hold the cams and toothed wheels in their "off" position. Simultaneously, the spring blade 42 prevents pinion 41 from rotating by constantly positioning and aligning the teeth of this pinion 41 in relation to the teeth of the registering matching toothed wheel 22. During a third time period or step, stop member 63 pushes back the extension 64 against the resilient force of spring 52 and in the direction of the arrow 56, and the aligning lever 51 is pivoted as shown by the arrow 79, so that the beaks 51' and 51" of this lever engage the contours of heart-shaped cams 22 and 33, respectively. Since these heart-shaped cams are properly set angularly or timed in relation to notches 14' and 14", the beaks cause the notched cams to rotate until the notches 14', 14" thereof are aligned and register substantially with the corresponding beaks 15', 15". Under these condition and at the end of this third time period or step, the various component elements are in the positions shown in FIG. 4.

Thus, the push member 72 can be released so that slide 53 can be moved back in the direction 65 by spring 55 so as to release firstly the aligning lever 51, whereby the beaks 51', 51" thereof are moved away from the heart-shaped cams 23 and 33, respectively. The two-armed sliding lever 45 is then released in turn, so that the cams and toothed wheels can be moved in the direction 48 by the force of spring 52; thus toothed wheel 22 will easily mesh with the teeth of pinion 41 due to the action exerted by the positioning spring blade 42, and toothed wheel 21 mesh with the teeth of pinion 31. Finally, the rocker 15 is released and due to the action of spring 19 its beaks 15', 15" re-engage the contours of cams 11 and 12, respectively, and drop into the notches 14',14" thereof, respectively. Spring 19 and beaks 15',15" thus tend to keep the toothed wheels 21,22 in meshing engagement with the relevant pinions 31,41, due to the fact that the beaks engage in the direction 48 a point diametrally opposed to the point of meshing engagement between said wheels and pinions. At the same time, switch 16 is restored to its open-contact condition by the extension 18 of rocker 15.

During the operation of the roller-blind, rolling shutter or the like, the beaks 15', 15" are moved out from notches 14', 14" and switch 16 is released in its closed-contact position, thus permitting the rotation of the motor-reduction unit. Each time the beaks drop into the corresponding notches, the motor rotation is discontinued, the shutter or blind remaining constantly in the same rolled-up position.

As a rule, a second device (not shown) for controlling the motor-reduction unit is disposed in axial alignment with the above-described device within the inner tubular member 75 for controlling the stopping of the shutter or blind in its unrolled position. The toothed drive pinions of this device are easily mounted on shaft 38, the first power pinion of this second device being in this example preferably rigid with shaft 38 rigid in turn with toothed pinions 35 and 31. Another push member 72' is provided for controlling at will the mutual alignment of the notches of the cam members of this second control device, as in the case of the first device described hereinabove.

Figure 5:
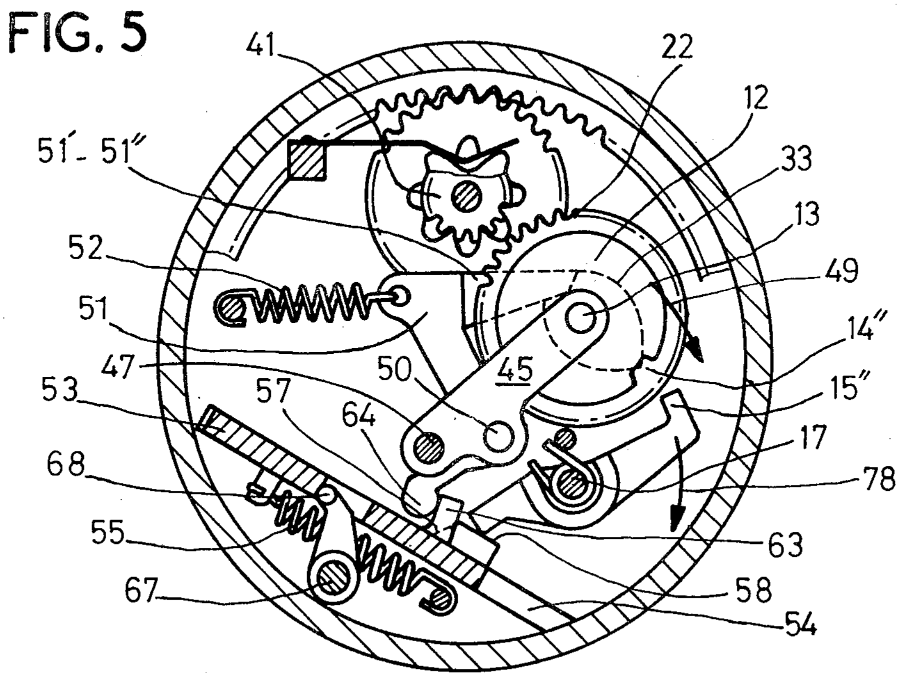
FIG. 5 is a view similar to FIG. 4 but showing a second form of embodiment of the invention.

In a second form of embodiment of the present invention shown in FIG. 5, the extension 62 of the first two-armed sliding lever 45 is dispensed with, together with the cam face 60 and bearing face 61 of slide 53. All the other component elements are identical with those of the first form of embodiment described hereinabove.

In this second form of embodiment, during the alignment of notches 14', 14", when the beaks 15', 15" have been moved in the direction 78, away from cams 11,12 only stop member 63 pushes back the extension 64 and it is the beaks 51', 51" of aligning lever 51 that move the heart-shaped cams 23,33 in the direction 49 to cause the toothed wheels 21,22 to become disengaged from the corresponding toothed pinions 31,41, respectively. When these component elements are disengaged from one another, the beaks 51', 51" cause the heart-shaped cams 23,33 to rotate and the alignment of notches 14', 14" (FIG. 5) as described hereinabove. Otherwise the operation is identical with that of the first form of embodiment.

Figure 6:
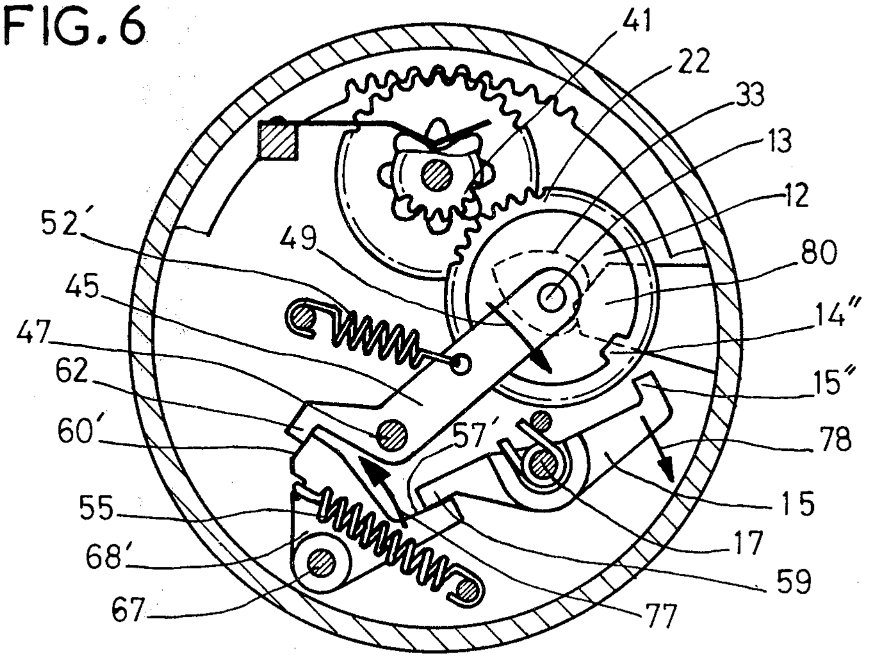
FIG. 6 is a view similar to FIG. 4 showing a third form of embodiment of the invention.

In the third form of embodiment illustrated in FIG. 6 the aligning lever 51, its extension 64 and pivot member 50 are dispensed with and replaced by an aligning element comprising a fixed stop member 80 shaped to permit the cooperation thereof with the outer contour of heart-shaped cams 23,33. The tension spring 52 of the preceding forms of embodiment is replaced by a tension spring 52′ having one end attached to the two-armed sliding lever 45. On the other hand, slide 53 is replaced by a pivotally mounted control member 68′ consisting in fact of the first lever 68 shaped for this purpose. Control member 68′ comprises an extension 57′ adapted to cooperate with extension 59, and another extension 60′ adapted to cooperate with extension 62. The other component elements of the mechanisms are identical with those of the first form of embodiment described hereinabove.

In operation, and during the alignment of notches 14′, 14″, the rotation of rod 67 and control lever 68′ in the direction 77 is attended, due to the action of extension 57′, during a first step, by the pivotal movement in the direction 78 of the beaks 15′, 15″ and, during a second step, as a consequence of the action exerted by extension 60′, by the movement in the direction 49 of the cams and toothed wheels. Provided that the heart-shaped cams are in proper timing or angular relationship with the notches, when these heart-shaped cams engage the fixed stop 80, they cause the notches cams 11,12 to rotate and the alignment of notches 14′,14″, as shown in FIG. 6. Otherwise, the operation of this modified embodiment is the same as that of the first form of embodiment.

The control mechanism according to this invention can be used for controlling electric motor-reduction units intended for driving rolling shutters, roller-blinds or other similar devices.

What is claimed is:

1. A control device for an electric motor-reduction unit adapted to drive a winding tubular member of a rolling shutter, roller-blind or the like, comprising a plurality of cams disposed side-by-side on a common shaft on which they are freely rotatable, each of said cams having in its perimeter a single notch, means controlling a switch in the energizing circuit of the electric motor of said motor-reduction unit, said control means having cam-follower means engagable with the perimeters of said notched cams, means biasing said control means into engagement with said notched cams, a toothed wheel rigidly coupled with each of said notched cams and disposed laterally and coaxially relatively thereto, drive pinions on a pinion shaft parallel to the cam shaft and engageable with said toothed wheels respectively, said pinions being adapted to drive said toothed wheels at different speeds, and means for aligning at will the notches of said notched cams with said cam follower means of said control means, said aligning means comprising a heart-shaped cam rigid with each of said notched cams and means engageable with said heart-shaped cams to align notches of said notched cams with said cam follower means of said control means, and re-setting means for sequentially moving and holding said control means away from said notched cams, disengaging said toothed wheels from said drive pinions, and bringing said aligning means into engagement with said heart-shaped cams to align notches of said notched cams with said cam follower means of said control means.

2. A control device according to claim 1, further comprising means for holding said driving pinions against rotation when disengaged from said toothed wheels.

3. A control device according to claim 1, wherein said cam shaft is mounted for lateral movement, and wherein said toothed wheels are disengaged from said drive pinions by lateral movement of said cam shaft in a direction away from said pinion shaft.

4. A control device according to claim 1, wherein said resetting means comprises a rotatable rod parallel to said cam shaft, a lever on said rod in close vicinity to an end of the motor reduction unit, push means adapted to act on said lever to rotate said rod and means on said rod for moving said control means away from said notched cams.

5. A control device according to claim 4 wherein said control means comprises a second lever on said rotatable rod.

6. A control device according to claim 3, wherein said cam follower means of said control means is engageable with said cams approximately diametrically opposite to engagement of said drive pinions with said toothed wheels.

7. A control device according to claim 6, wherein said cam shaft is supported by a pivoted arm, and said means engageable with said heart-shaped cams comprises a lever pivotally mounted on said pivoted arm.

8. A control device according to claim 3, wherein said means engageable with said heart-shaped cams comprises a stationary member which is engaged by said heart-shaped cams upon movement of said cam shaft in a direction away from said pinion shaft.

9. A control device according to claim 4 wherein said cam shaft is mounted for lateral movement away from said pinion shaft to disengage said toothed wheels from said pinions, and wherein said resetting means further comprises a slidable cam plate movable by rotation of said rod and having cams for moving said cam shaft away from said pinion shaft to disengage said toothed wheels from said pinions and for moving said heart-shaped cam engaging means into engagement with said heart-shaped cams.

10. A control device according to claim 3, wherein said means engageable with said heart-shaped cams acts on said cams in a direction to move said cam shaft away from said pinion shaft and thereby disengage said toothed wheels from said drive pinions.

* * * * *